C. F. STEIGER.
PIPE OR HOSE COUPLING.
APPLICATION FILED JUNE 24, 1918.
1,288,256.
Patented Dec. 17, 1918.
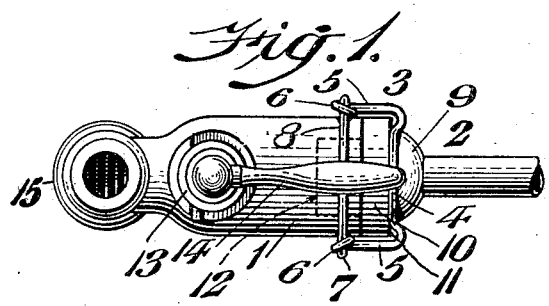
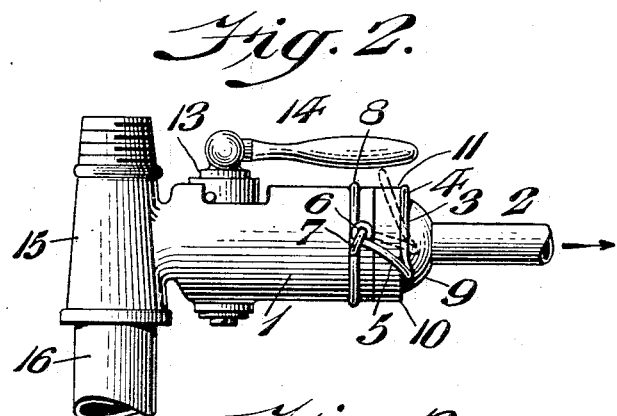
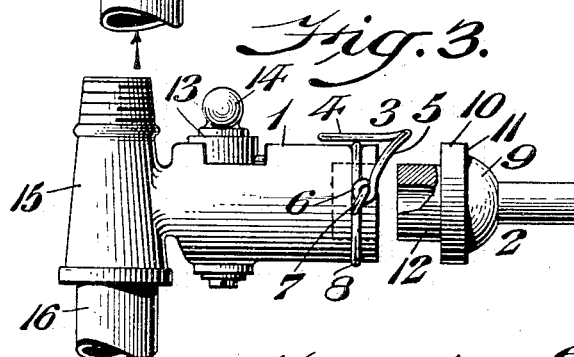
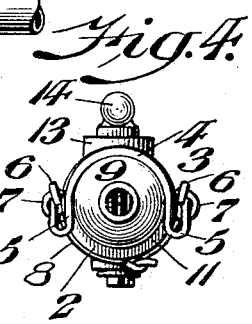
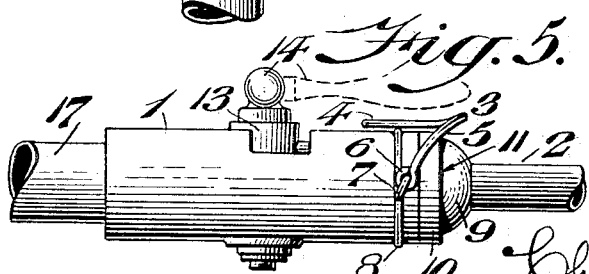
INVENTOR
Charles F. Steiger
BY
Niedersheim + Fairbanks
ATTORNEYS

UNITED STATES PATENT OFFICE.

CHARLES F. STEIGER, OF CAMDEN, NEW JERSEY.

PIPE OR HOSE COUPLING.

1,288,256.  Specification of Letters Patent.  Patented Dec. 17, 1918.

Application filed June 24, 1918. Serial No. 241,520.

*To all whom it may concern:*

Be it known that I, CHARLES F. STEIGER, a citizen of the United States, residing in the city and county of Camden, State of New Jersey, have invented a new and useful Pipe or Hose Coupling, of which the following is a specification.

My invention consists of a device for coupling a pipe or hose, the same embodying a yoke-like member, and an opposite shoulder-like member with which the former is adapted to be engaged, and means for preventing disconnection of said members and improper uncoupling of the opposite parts of the pipe or hose.

The invention is satisfactorily illustrated in the accompanying drawings, but the important instrumentalities thereof may be varied, and so it is to be understood that the invention is not limited to the specific details shown and described, as long as they are within the spirit or scope of the claims.

Figures 1 and 2 represent side elevations at a right angle to each other of a coupling device for an opposite pipe or hose embodying my invention.

Fig. 3 represents a side elevation partly cut away of the device, the members of which are shown uncoupled.

Fig. 4 represents an end elevation thereof.

Fig. 5 represents a side elevation of another embodiment of the invention.

Similar numerals of reference indicate corresponding parts in the figures.

Referring to the drawings, 1 designates a shell for a cock, valve, or the like, and 2 a thimble on which a pipe or hose to be coupled is fitted.

3 designates a coupling member which consists of the yoke 4 of U-shape formed of wire or other suitable material, and the arms 5 which extend rearward from the terminals of the legs of said yoke at acute angles longitudinally forward from the lower terminals of said legs and have on their ends the eyes 6 which are pivotally connected with eyes 7 on the clamping ring 8 of wire or other suitable material, said eyes being inclined and said ring being secured to the exterior of the shell 1, thus firmly retaining the coupling member in position and permitting the same to be turned in directions comparatively vertical and horizontal.

The thimble 2 has on its inner end a partially-spherical swell or enlargement 9, on the inner side of which is the peripheral flange 10 which is of such diameter as to form the shoulder 11, where said flange joins said swell. Extending from the side of said flange opposite to said swell 9 is the nipple 12, it being noticed that said nipple, flange, collar and thimble are tubular so that fluid from a pipe or hose attachable to the thimble may flow through the bore of said parts. The nipple 12 forms a neck adapted to enter the adjacent portion of the shell 1, and so communicates with the latter. When this is accomplished the yoke as shown in the position Fig. 3 is turned over the flange 10, and so engaged with the shoulder 11, and embracing the adjacent surface of the swell 9, as shown in Figs. 1 and 2, thus retaining the nipple firmly in the shell, and consequently coupling the pipe or hose on the thimble 2 with the cock or like member 1, in an effective manner. The terminals of the legs of the yoke and the adjacent ends of the arms 5 are joined by the bends of the wire or material of which said arms and legs are formed, thus adapting the yoke 4 to be resilient so that the crown of said yoke can be forced over the flange 10 and resiliently engage the shoulder 11 thereof, whereby said yoke will be held resiliently but tightly on the side of said shoulder, thus causing effective coupling of the opposite parts.

It will be noticed that the ported plug 13 of the cock or the like has a handle 14 which extends laterally therefrom, and so when the device is in use and the cock or the like is open, said handle overhangs the yoke 4, and is adjacent thereto to such extent that should the yoke be struck or kicked whereby it is moved in the present case upwardly, its crown will contact with the said handle 14 and prevent any material movement of the yoke from the side of the shoulder 11 whereby the yoke remains in a position sufficient to preserve the coupling of the pipe or hose with the cock or the like, see dotted lines Fig. 2.

When the uncoupling is to be effected the plug is turned to prevent the flow of fluid through the cock or the like when the handle is extended at an angle from that shown in Figs. 1 and 2, to that shown in Fig. 3, when the yoke may be fully thrown up clearing the shoulder 11, when the nipple 12 with its connected parts may be withdrawn from the shell, thus uncoupling the pipe or hose from the cock or the like.

The device will be found more particularly serviceable as a coupling for the cock of a gas stove with the gas conveyer leading from said cock to the stove, the accidental uncoupling of said conveyer so often unperceived being dangerous to the occupant of the apartment in which the stove is located.

The shell of the cock has attached thereto at an angle therewith the service sleeve 15 to which latter the gas supply pipe 16 is attached.

In Fig. 5 the gas supply pipe 17 is connected in right lined direction with the shell 1, the operation of the coupling in this case being similar to that in the prior figures.

Having thus described my invention what I claim as new and desire to secure by Letters Patent, is:—

1. A cock or like article, a yoke-like device pivotally connected with the shell of said article, a tubular thimble with which a pipe or hose is attachable, and a shoulder, and a tubular nipple on said thimble, said nipple being adapted to enter an end of said shell, and said yoke-like device being adapted to engage said shoulder and embrace an adjacent portion of said thimble, said cock or like article having its ported plug provided with a handle which when said article is open is adapted to overhang said yoke-like device in the locked position of the latter as a stop preventing the displacement thereof and uncoupling action.

2. In a coupling of the character stated, a shoulder on the exterior of one part to be coupled, a clamping ring on the exterior of the other part to be coupled, eyes on said ring, a yoke substantially U-shape adapted to engage said shoulder, arms extending from the terminals of the legs of said yoke, and means on the terminals of said arms for pivotally connecting the latter with said eyes, said arms extending angularly and longitudinally from the terminals of said legs, and said eyes extending in an inclined direction to the circular direction of said ring.

CHARLES F. STEIGER.

Witnesses:
JOHN A. WIEDERSHEIM,
E. HAYWARD FAIRBANKS.

Copies of this patent may be obtained for five cents each, by addressing the "Commissioner of Patents, Washington, D. C."